US007128332B2

(12) United States Patent
Hermes et al.

(10) Patent No.: US 7,128,332 B2
(45) Date of Patent: Oct. 31, 2006

(54) WHEELCHAIR DESIGNS AND RELATED ENHANCEMENTS

(75) Inventors: Matthew E. Hermes, Beaufort, SC (US); Jane Hermes, Beaufort, SC (US); Michael P. Chesterfield, Princeton, NJ (US)

(73) Assignee: Turbo Wheelchair Co., Inc., Beaufort, SC (US)

( * ) Notice: Subject to any disclaimer, the term of this patent is extended or adjusted under 35 U.S.C. 154(b) by 0 days.

(21) Appl. No.: 10/961,718

(22) Filed: Oct. 8, 2004

(65) Prior Publication Data

US 2005/0098970 A1 May 12, 2005

Related U.S. Application Data

(60) Provisional application No. 60/509,696, filed on Oct. 8, 2003.

(51) Int. Cl.
*B62B 3/00* (2006.01)

(52) U.S. Cl. ...................... 280/647; 280/650; 280/642; 280/250.1; 297/DIG. 4; 297/42; 297/44; 108/158.12

(58) Field of Classification Search ................ 280/647, 280/650, 642, 250.1; 297/DIG. 4, 452.21, 297/452.22, 452.23, 452.24, 452.25, 452.26, 297/42, 44, 452.4, 440.14; 108/158.12, 180
See application file for complete search history.

(56) References Cited

U.S. PATENT DOCUMENTS 1,963,835 A * 6/1934 Deland ........................ 297/44
2,043,669 A * 6/1936 Liska ......................... 297/187
2,782,870 A * 2/1957 Sill ............................ 188/2 F
2,946,602 A * 7/1960 Lee ............................ 280/211
3,323,144 A * 6/1967 Ferris, Jr. ....................... 4/254
3,767,260 A * 10/1973 Limpach .................. 297/411.3
3,833,256 A * 9/1974 Dehner ........................ 297/44
4,026,568 A * 5/1977 Hallam ........................ 280/42
4,625,984 A * 12/1986 Kitrell ..................... 280/250.1
4,630,863 A * 12/1986 Roberts ................... 297/219.1
4,726,624 A * 2/1988 Jay ....................... 297/452.25
4,770,432 A * 9/1988 Wagner ................... 280/250.1
4,917,395 A * 4/1990 Gabriele .................. 280/250.1
4,953,913 A * 9/1990 Graebe .................. 297/452.25
5,240,276 A * 8/1993 Coombs ..................... 280/647
5,244,222 A * 9/1993 Benoit ..................... 280/250.1
5,284,350 A * 2/1994 Geiger et al. ............ 280/250.1
5,360,224 A * 11/1994 Geiger et al. ............ 280/250.1
5,496,050 A * 3/1996 Geiger et al. ............ 280/250.1
5,544,940 A * 8/1996 Stevens ................. 297/411.28
5,568,933 A * 10/1996 Mizuno ....................... 280/42

(Continued)

*Primary Examiner*—Christopher P. Ellis
*Assistant Examiner*—Vaughn Coolman
(74) *Attorney, Agent, or Firm*—McCarter & English, LLP

(57) ABSTRACT

Wheelchair designs and enhancements are provided for use with conventional wheelchair designs. The designs and enhancements include first and second contoured folding seat panels that are hingedly mounted with respect to the wheelchair frame and that are offer interlocking functionality. The folding seats generally provide contouring in both front-to-back and side-to-side directions. Features are provided to prevent capture of objects between seat panels as they are brought into interlocking engagement. Pivotal footrests that offer enhanced stability in the form of lateral, front-to-back and up-down stability are provided In addition, axle and axle plate combinations are described that provide enhanced flexibility in relative positioning with respect to the wheelchair frame. The disclosed features and functionalities may be incorporated into wheelchair designs, either in whole or in part, to provide enhanced user interaction with the wheelchair.

13 Claims, 13 Drawing Sheets

U.S. PATENT DOCUMENTS 5,746,479 A * 5/1998 Bodnar .................. 297/411.26
5,797,649 A * 8/1998 Snell et al. ................... 297/14
5,803,415 A * 9/1998 Konishi et al. ............. 248/118
5,823,976 A * 10/1998 Cain et al. .................... 601/23
6,036,216 A 3/2000 Osborn
6,063,216 A * 5/2000 Damm et al. ............... 148/645
6,318,751 B1 * 11/2001 Slagerman .................. 280/647
6,338,493 B1 * 1/2002 Wohlgemuth et al. ........ 280/30
6,345,833 B1 * 2/2002 Melgarejo et al. ....... 280/250.1

* cited by examiner

WHEELCHAIR DESIGNS AND RELATED ENHANCEMENTS

CROSS-REFERENCE TO RELATED APPLICATIONS

The present application claims the benefit of a commonly assigned, co-pending provisional patent application entitled "Wheelchair Design Enhancements," which was filed on Oct. 8, 2003 and assigned Ser. No. 60/509,696. The entire contents of the foregoing provisional patent application are incorporated herein by reference.

BACKGROUND

1. Technical Field

The present disclosure relates generally to wheelchair designs and, more particularly, to wheelchair designs and related enhancements that include one or more of the following advantageous structural and/or functional features: an improved folding seat, interlocking/interchangeable footrests, a protective non-pinching hinge design, a multipurpose axle and axle plate system and/or right/left interchangeable armrest supports.

2. Discussion of Background Art

Standard wheelchair construction generally includes a welded tubular metal frame having seat and back elements of flexible material or fabric spanning the space between either side of the frame. Although foldable and of relatively light weight, such construction is inherently unstable and subject to weakening and breakage, predominantly at the weld locations and through the fabric elements. Furthermore, the initial construction and subsequent repair of such wheelchairs is expensive and requires technical expertise associated with bending and welding of tubular steel.

Foldable wheelchairs made from modular panels have also been proposed. For example, U.S. Pat. No. 4,625,984 to Kitrell discloses a folding wheelchair having two side frames connected by hinged foot and back panels. This design, however, includes a tubular metal framework in the side frames and requires that the seat be totally removed in order to fold. Furthermore, a wheel and belt motive system adds to the complexity of the construction.

U.S. Pat. No. 4,770,432 to Wagner discloses a foldable wheelchair constructed of panels of skinned polymeric foam which are secured together by piano type hinges. These hinges require continued maintenance and add to the skill and cost required in assembly and maintenance.

U.S. Pat. No. 4,917,395 to Gabriele discloses a wheelchair having a hinge construction between the side panels and seat and back panels which is an integrally molded part of the respective panels, providing both bearing and support surfaces. Although providing relative ease of assembly, such an integral hinge construction requires complete replacement of a panel should one portion of a hinge surface fail, thus increasing the cost of repair. Additionally, individual parts of this construction are not interchangeable from left to right.

U.S. Pat. No. 5,240,276 to Coombs discloses a foldable wheelchair construction with interchangeable right and left panels. The Coombs '276 design offers a simple and inexpensive construction for a wheelchair which may be assembled by relatively unskilled persons and which permits easy repair of broken parts. These parts include left and right side panels and at least two seat panels which together form the primary structure of the chair. The panels are made of a substantially rigid material, preferably injection molded polymer resin, and are held together in a chair configuration by means of interlocking fasteners. Additional frame stability is achieved by an interlocking pivotable lower support member, and a foldable stay member between the side panels. Wheels are attached in a conventional manner which permits vertical adjustment of the chair. The wheelchair of the Coombs '276 patent is easy to manufacture into a durable, rigid structure that virtually eliminates the primary causes of structural wheelchair failure, such as frame cracks, broken welds, fabric tears and chronic misalignment. The entire disclosure of the Coombs '276 patent is incorporated herein by reference.

Despite the highly advantageous features and functions of the wheelchair design(s) disclosed in the Coombs '276 patent, opportunities exist to improve upon features and functions thereof. The present disclosure is directed to wheelchair design enhancements having particular applicability to wheelchair(s) of the general type disclosed in the Coombs '276 patent. However, the design enhancements of the present disclosure are not limited to the wheelchairs of the Coombs '276 patent, but have wide applicability to wheelchair design and manufacture, as will be apparent to persons skilled in the art.

SUMMARY OF THE DISCLOSURE

The present disclosure is directed to wheelchair designs and enhancements thereof that offer advantageous structural and/or functional benefits to wheelchair manufacturers and wheelchair users. The wheelchair designs and associated enhancements disclosed herein include:

1. A wheelchair design wherein right/left interchangeable contoured folding seat components offer contouring in both front-to-back and side-to-side directions. The contouring is identical at front and back so that two seat panels can be reversed front to back and used to make a complete seat.
2. A wheelchair design wherein the footrests are left/right identical and interlocking to provide lateral, front-to-back and up-down stability as the chair is operated.
3. A wheelchair design wherein right/left identical seat panels are provided that remove the possibility of in-line capture of objects in the closing hinge. Exemplary seat panels according to the present disclosure are modified at the hinge-pin area so as to provide segmented sections with alternating extending hinge-pin sections and receding sections into which extended hinge-pin sections will fit:
4. A wheelchair design wherein a combination axle and axle plate and a molded panel designed to receive such an axle and axle plate are provided. The combination allows choice of at least two vertical and two horizontal positions in the assembly of the axle/axle plate combination to the molded side. A molded panel is also advantageously provided that is designed to receive the disclosed axle and axle plate such that the combination allows desired positional choices.
5. A wheelchair design wherein the armrest supports advantageously enable an integrated armrest-chair configuration that provides all desired stability and flexibility. An exemplary molded armrest support according to the present disclosure includes four essentially rectangular extensions that extend from a box-like structure upon which the armrest itself is affixed. The extensions fit across and straddle two saddles on the top of the forward section of the side component.

Additional structural and functional features and advantages of the disclosed wheelchair designs and associated enhancements will be apparent from the detailed description which follows, taken together with the appended figures.

BRIEF DESCRIPTION OF THE DRAWINGS

So that those having ordinary skill in the art to which the present disclosure appertains will have a better understanding of how to make and use the wheelchair designs of the present disclosure and enhancements thereof, reference is made to the drawings appended hereto, wherein.

DETAILED DESCRIPTION OF EXEMPLARY EMBODIMENTS

Figure 1A:
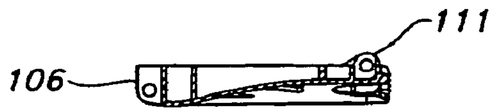
FIGS. 1A and 1C are side views of an exemplary contoured seat panel according to one aspect of the present disclosure.
Figure 1D:
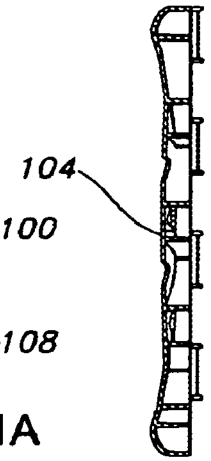
FIGS. 1D and 1E are edge views of the exemplary seat panel of FIGS. 1A–1C.
Figure 1E:
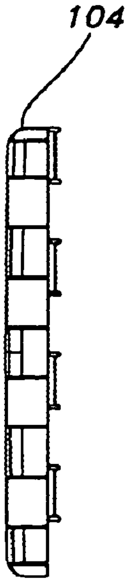
Figure 1B:
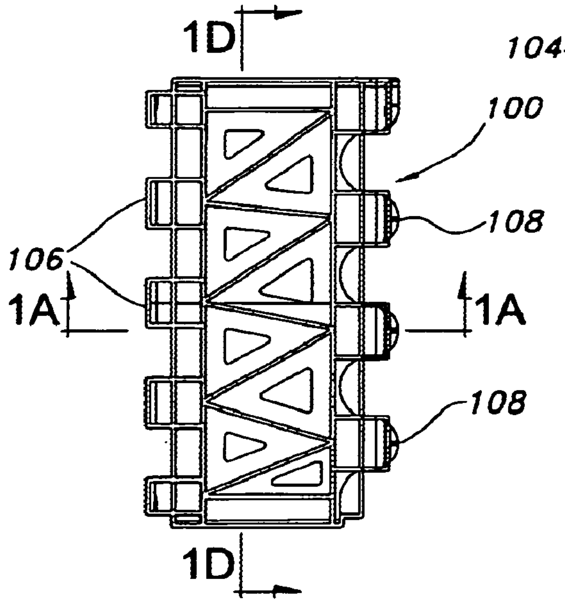
FIG. 1B is a bottom view of the exemplary seat panel of FIGS. 1A and C.
Figure 1F:
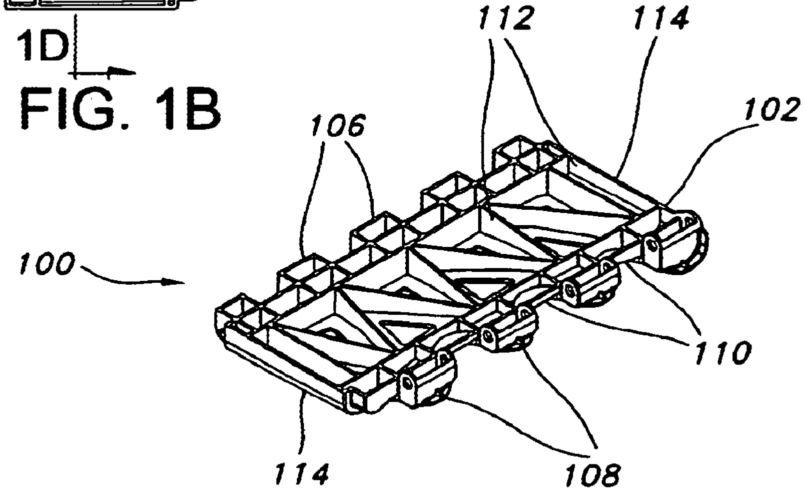
FIG. 1F is a top view of the exemplary seat panel of FIGS. 1A–1D.
Figure 1C:
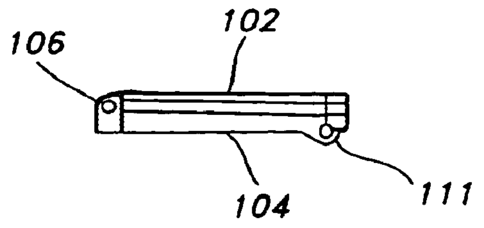

The present disclosure provides wheelchair designs and associated enhancements that offer advantageous structural and/or functional benefits to wheelchair manufacturers and wheelchair users. The disclosed wheelchair designs and associated enhancements have particular applicability to the wheelchair designs of the Coombs ’276 patent (previously incorporated herein by reference). However, the disclosed wheelchair designs and associated enhancements have wide applicability, and are not limited to applications as part of the wheelchairs of the type or design disclosed in the Coombs ’276 patent.

The advantageous designs/enhancements of the present disclosure are described in greater detail and with reference to exemplary embodiments thereof. The disclosed designs and associated enhancements may be incorporated into a wheelchair design, as desired. Thus, it is specifically contemplated that: (i) each of the disclosed designs/enhancements may be incorporated into a single wheelchair design (in whole or in part), and (ii) one or more individual designs/enhancements may be selected for inclusion in a wheelchair design (in whole or in part), while excluding other of the disclosed designs/enhancements therefrom. In other words, it is contemplated that advantageous results may be achieved by using all, or less than all, of the disclosed designs and associated enhancements in a wheelchair design. The present disclosure and appended claims are expressly directed to implementations wherein combinations and sub-combinations of the disclosed designs and associated enhancements are incorporated into wheelchair products.

1. Solid Contoured Seat for Mobile Chair

The Coombs ’276 patent discloses assembly of a chair utilizing a hinged molded panel seat with a planar upper surface that is attached by hinge pins to a like panel at the center and through retainers to the sides of the chair. The Coombs ’276 chair is disadvantageous in that flat panels do not offer the best seating surface for users. Optimum seating is designed to contour the seat to the physical anatomy. Optimum seating surfaces will be contoured side-to-side to support the sides, thighs and buttocks of the users and will be contoured front to back to support the thighs in the front and follow the curve of the buttocks in the rear.

According to one embodiment of the present disclosure, right/left interchangeable contoured folding seats are provided that offer advantageous contouring in both front-to-back and side-to-side directions. The contouring is identical at front and back, so that two seat panels can be reversed front to back and can be used to make a complete seat, as described in the Coombs ’276 patent.

In the particular example exemplifying this aspect of the present invention, the seat panel is 18" long and 10" wide with a hinge hidden beneath the surface. The surface is contoured so that the side elevation is ¾" above the low point of the surface. The front and rear elevations are ⅝"

above the low point of the seat surface. Alternative dimensions and geometric features may be incorporated into the disclosed seat panels without departing from the spirit or scope of the present disclosure.

The seat may be advantageously ribbed to reduce weight and, in exemplary embodiments, has a series of openings that serve to allow air and moisture passage from the body of the user to improve comfort.

Figure 2:
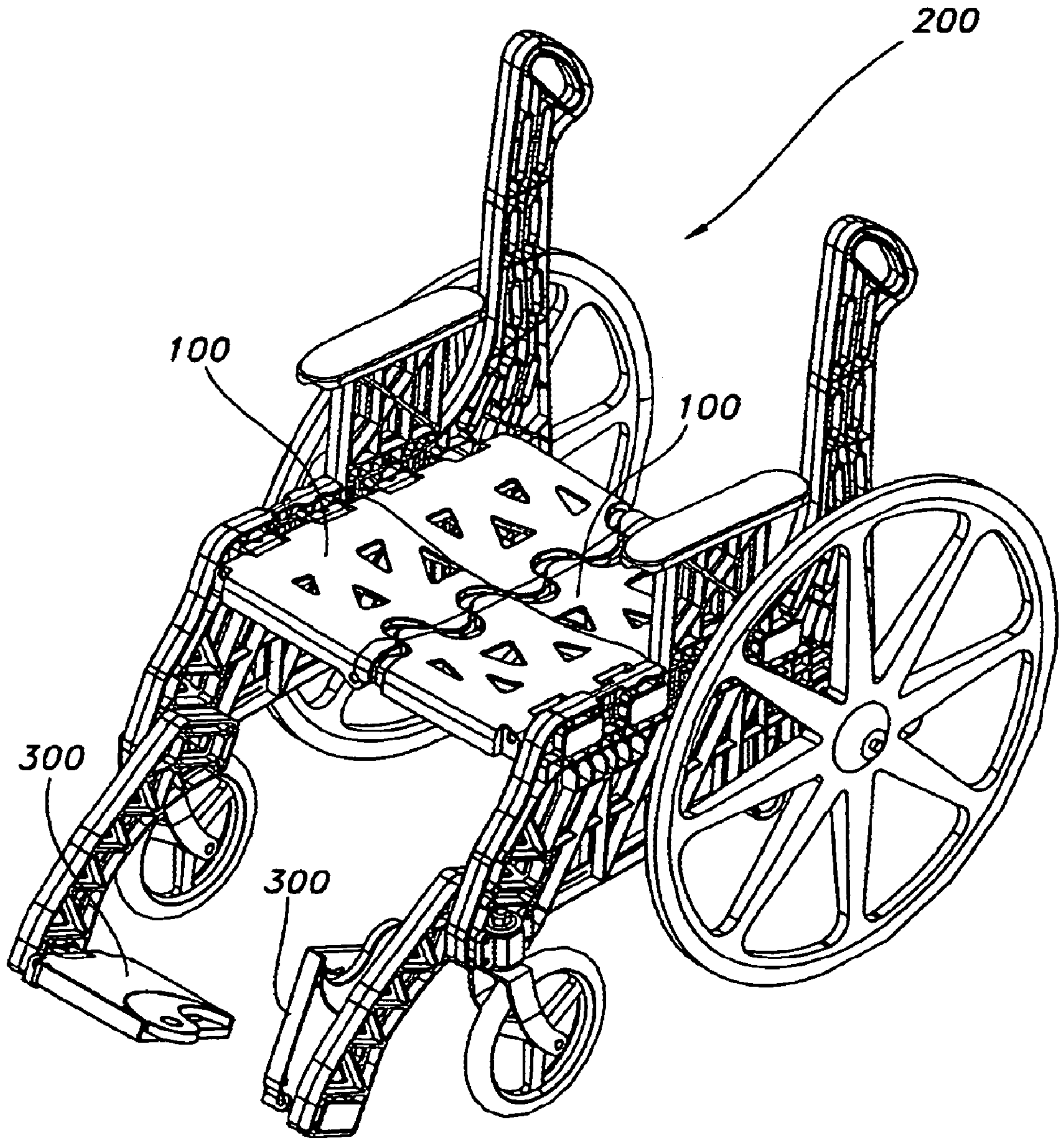
FIG. 2 is a perspective view of an exemplary wheelchair having interlocking seat panels and interlocking footrest elements according to a further aspect of the present disclosure.

FIGS. 1A–1F provide views of an exemplary implementation of the disclosed seat panel(s) of the present disclosure. FIG. 2 provides a view of an assembled wheelchair 200 that includes a pair of seat panels 100 in a deployed and interlocking orientation. With particular reference to such figures, seat panel 100 includes a top surface 102, bottom surface 104 and hinge flange extensions 106. One or more hinge pins (not pictured) are generally inserted through aligned apertures formed on hinge flange extensions 106 and cooperating pin apertures formed on the body of the wheelchair to achieve hinged or rotational mounting of seat panel 100 relative to the wheelchair body. When in a non-deployed (i.e., non-interlocking) orientation, seat panel(s) 100 are generally adapted to rotate "upward" relative to the wheelchair body, thereby coming into alignment with armrests (if present).

With further reference to the foregoing figures and with particular reference to the interlocking aspect of seat panel (s) 100, a series of interlocking extensions 108 are formed at an edge opposite hinge flange extensions 106. Extensions 108 generally define an arcuate end-face and are spaced by a predetermined distance relative to each other. Alternative end-face geometries may be utilized, e.g., polyhedral, saw-tooth or the like, provided a symmetric geometric arrangement is achieved. Thus, the end-faces of interlocking extensions 108 are aligned, dimensioned and adapted to interface with a corresponding receiving depression 110 formed in the opposite (or cooperating) seat panel 100 to define an interlocking and substantially smooth (i.e., flush) interaction when viewed at top surface 106. The depth of depression 110 is generally substantially equal to the thickness of extension 108, such that the combined thickness of a seat panel 100 in the region of extension/depression interaction is equal to the overall thickness of seat panel 100 adjacent to such interaction region. A series of aligned apertures 111 may be formed on the undersurface of extensions 108 to receive a stabilizing pin/rod (not shown) when a pair of seat panels are brought into interlocking engagements. An exemplary interlocking relationship is best shown in FIG. 2 hereto.

The central region of seat panel 100 generally includes a plurality of openings 112 to facilitate the passage of air/moisture and to reduce the weight/material cost associated with seat panel manufacture. In the exemplary embodiment of FIGS. 1 and 2, substantially triangular openings 112 are defined in the seating surfaces of seat panels 100. Contouring of seat panel(s) 100 is generally achieved in the manufacturing process, e.g., through mold design and dimensioning, and exemplary contouring dimensions/features are described hereinabove. A rounded, beveled or chamfered front/rear surface 114 is generally formed on seat panel(s) 100 to further improve the user comfort of seat panel(s) 100.

Of particularly significance with respect to seat panel(s) 100 is the mirror-like symmetry that is achieved in the design and manufacture thereof. By rotating a seat panel by 180°, a right seat panel 100 becomes a left seat panel 100 (and vice versa). The design, dimensioning and orientation of extensions 108 and corresponding depressions 110 are such that alignment/engagement of a pair of seat panels 100 is achieved, regardless of whether an individual seat panel

100 is used as a right or left panel. Significant advantages in manufacturing and inventory control efficiencies are achieved through the interchangability of seat panels 100, as described herein. The overall functionality of seat panel(s) 100 is also beneficial to wheelchair users, including such beneficial features as the convenient pivotal/rotational capabilities of seat panel(s) 100 relative to the overall wheelchair, which facilitates ease of wheelchair assembly and disassembly.

In sum and as is readily apparent, the disclosed seat panel offers significant advantages to wheelchair users, in that greater comfort is ensured. Moreover, the disclosed design offers significant manufacturing advantages, in that inventory control is reduced and assembly facilitated through the identical right/left panel design. Additional benefits and advantages of the disclosed seat panel design will be readily apparent to persons skilled in the art.

2. Simultaneously Interlocking Interchangeable Footrests and Incorporation into Manual (Mechanical) Wheelchair As noted above, the Coombs '276 patent discloses a foldable wheelchair construction with interchangeable right and left molded panels. The Coombs wheelchair is easy to manufacture into a durable, rigid structure that virtually eliminates the primary causes of structural failure such as frame cracks, broken welds, fabric tears and chronic misalignment.

The Coombs '276 patent discloses assembly of a chair utilizing a hinged molded footrest panels (FIG. 1, element 47) with planar upper surfaces that are attached by hinge pins (FIG. 22, element 51) to flanged hinge elements (FIG. 22, element. 17) inserted into footrest support panels (FIG. 1, element 46) attached to the side panels of the chair (FIG. 1, element 1).

The chair described above is disadvantageous in that the deployed footrest panels do not offer the best support for the users because the weight of the user's lower body deflects the footrest and support assembly outward under load. As a result, the casters (FIG. 1, element 6) and caster assemblies of the Coombs design deflect outward, causing difficulties in steering and turning the chair. Eventually, outward flexion of the assembly could lead to failure of the assembly under load. In addition, when a user turns the chair, shear forces along the midline of the chair cause a forward deflection of the side of the chair on the outside of the turning radius. Lateral deflection of the top of the chair causes one footrest to elevate in relation to the other. These three directional instabilities reduce the effectiveness of the Coombs '276 wheelchair design.

According to exemplary embodiments of the present disclosure, these problems of three-dimensional stability are overcome. Fundamental to successfully addressing such instability according to the present disclosure are designs and associated enhancements wherein the footrests advantageously interlock. According to exemplary embodiments of the present disclosure, the footrests are left/right identical (as described in the Coombs '276 patent). With further reference to FIGS. 2–6, features and functions of exemplary interlocking footrests 300 according to an exemplary embodiment of the present disclosure are depicted. As described in greater detail hereinbelow, interchangeable right/left footrest elements incorporated into a wheelchair according to the disclosed designs and associated enhancements advantageously interlock in three dimensions and provide lateral, front-to-back and up-down stability as the chair is operated.

Figure 3:
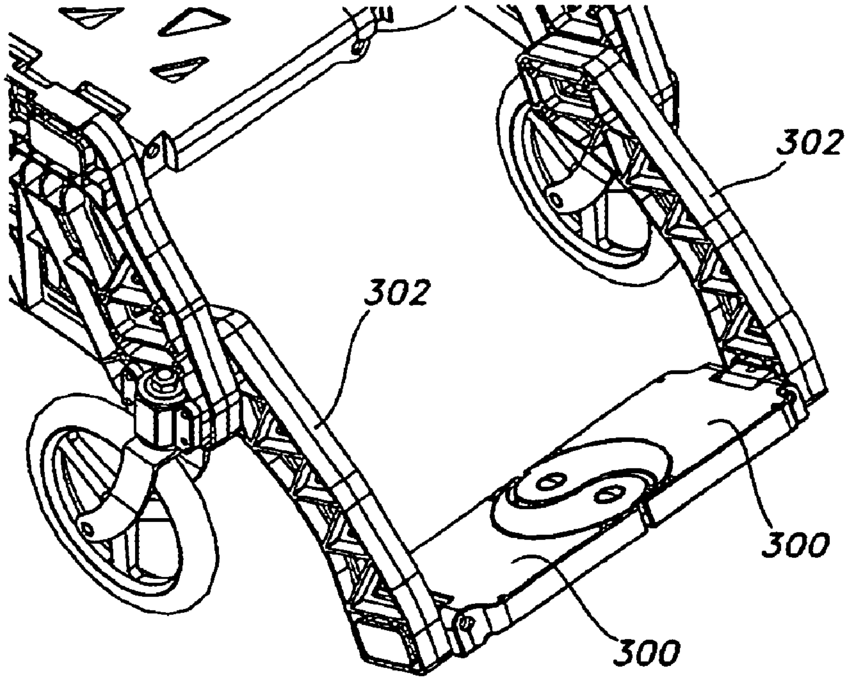
FIG. 3 is a perspective view of exemplary interlocked footrest elements according to the present disclosure.
Figure 4:
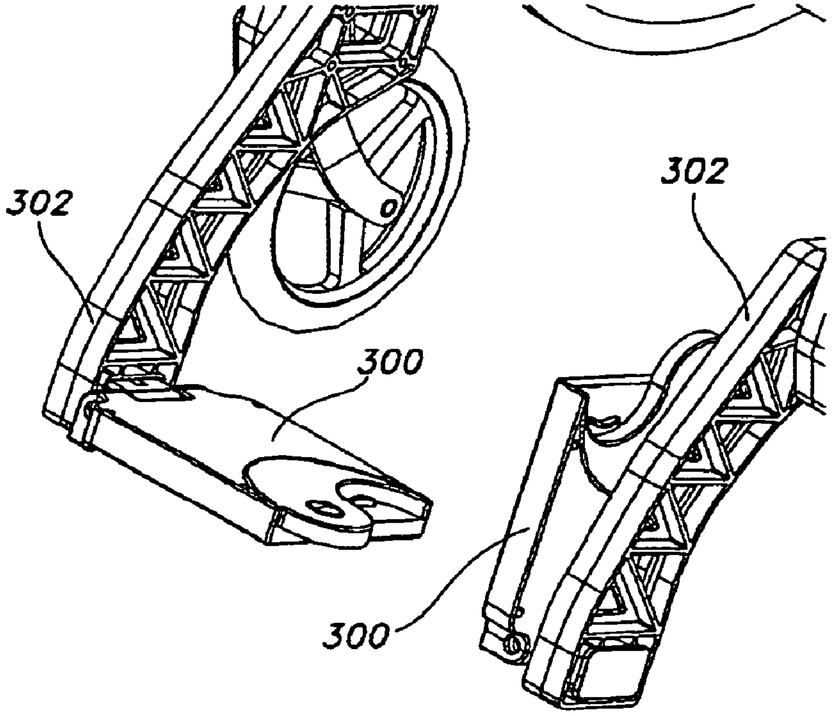
FIG. 4 is a perspective view of the lower portion of an exemplary wheelchair design, with one of the footrests in a raised orientation.
Figure 5:
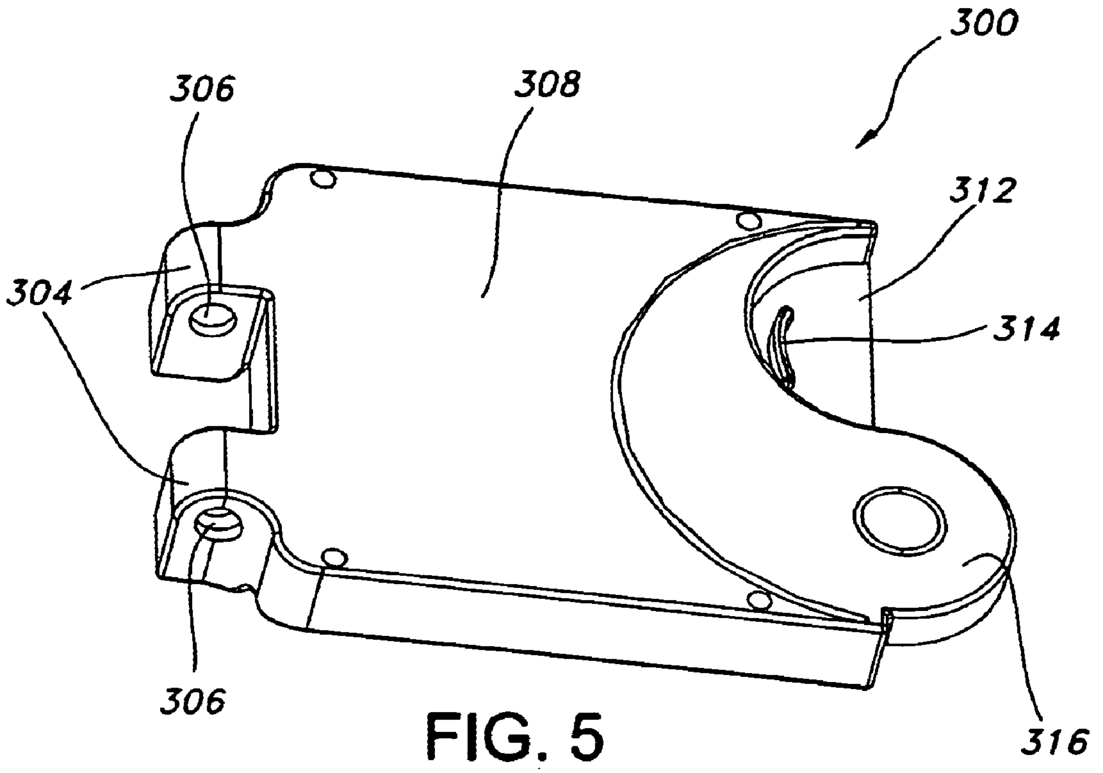
FIG. 5 is a top view of an exemplary footrest element according to the present disclosure.
Figure 6:
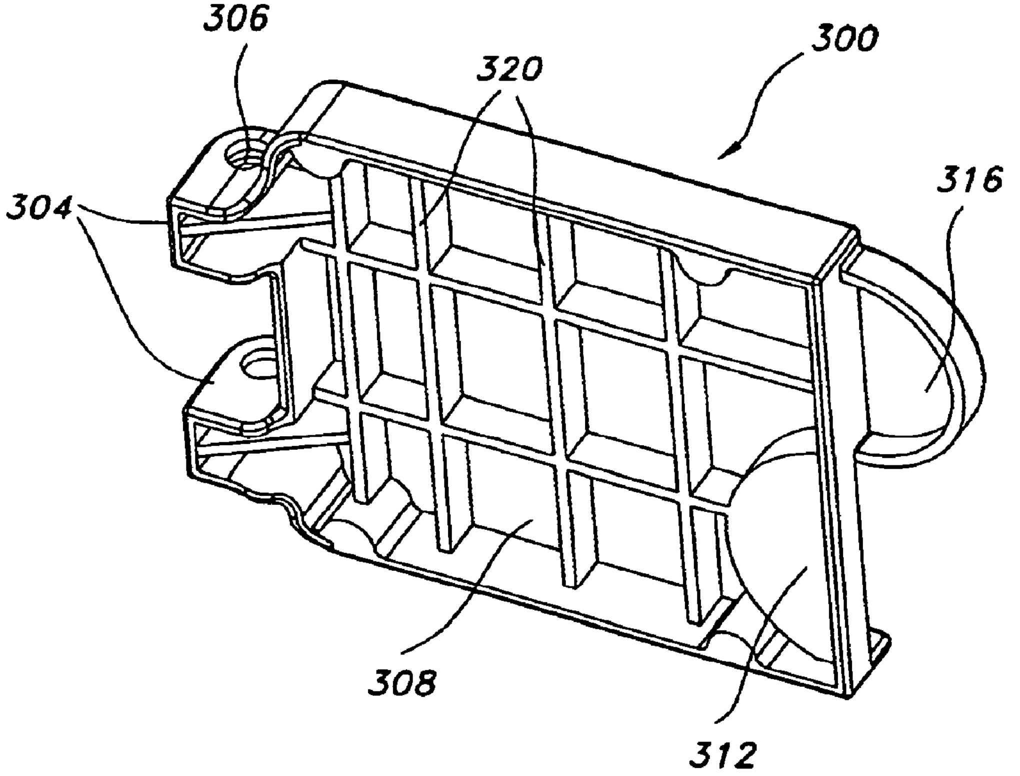
FIG. 6 is an angled view of the bottom surface of a footrest element according to an exemplary embodiment of one aspect of the present disclosure.

As shown in FIG. 3, the exemplary footrests 300 of the present disclosure are shown in a linked orientation to define a footrest support assembly, i.e., as they would be deployed in chair use. Each footrest 300 is hingedly or pivotally mounted with respect to an extension flange 302 that is mounted with respect to a wheelchair, e.g., wheelchair 200 of FIG. 2. With particular reference to FIGS. 5 and 6, hinge flanges 304 extend from one end or edge of footrest body 308. Each hinge flange 304 defines an aperture 306 that is adapted to receive a pin/rod (not pictured) for purposes of mounting with respect to extension flange 302. As shown in FIG. 4, each footrest 300 is independently pivotal with respect to an associated extension flange 302, such that the footrest may be brought into interlocking engagement with a cooperating footrest 300 or moved out of engagement, e.g., into juxtaposition with an associated extension flange 302. Thus, FIG. 4 illustrates the manner in which the footrests may be disengaged, e.g., when a user is seeking to stand or the wheelchair is being folded, etc.

FIGS. 5 and 6 show details of an exemplary footrest 300 according to the present disclosure. As shown therein, each of the disclosed footrest elements includes an indented region 312 formed in the footrest body 308. The indented region 312 is typically formed in the manufacturing process, e.g., through appropriate mold design and implementation. A tooth 314 is advantageously formed in the indented region 312 to facilitate interaction with a second footrest element (e.g., as shown in FIG. 3). The disclosed footrest element 300 also includes a lipped extending tongue or tab 316 that is dimensioned and configured to cooperate with the indented region 312 of a second footrest element, thereby facilitating interlocking engagement therewith.

With particular reference to FIG. 6, the bottom side of the footrest 300 of FIG. 5 is depicted. Features of the extending tab 316 are apparent from the bottom view of FIG. 6. Thus, the cavity formed in the bottom surface thereof may be viewed, which facilitates cooperation with the indented region 312 of a second footrest element 300. Also apparent from the bottom view of FIG. 6 is an exemplary ribbed design, which includes a plurality of transversely oriented ribs 320. Ribs 320 contribute to the structural stability of footrest 300, while simultaneously minimizing the weight and materials associated with manufacture thereof.

When two footrest elements 300 are brought together, as shown in FIG. 3, the tooth 314 that is formed in the partial depth indent region 312 of each footrest body 308 engages the lip of the extending tab 316 of the other footrest element. The footrest elements 300 may be brought together simultaneously by folding them down, allowing the extending tab 316 of each footrest body 308 to engage the tooth 314 in the partial depth indent region 312 of the other. As will be readily apparent to persons skilled in the art, the disclosed configuration advantageously prevents separation of the chair sides of a wheelchair through in-plane separation along the footrest side-to-side, long axis because of the locking of each footrest to the other at the location of the teeth and lip.

Moreover, the assembly also resists in-plane separation of the footrests along the short, front-to-back axis because the combined geometry of the extension 316 and indent region 312 on the footrests establishes interference to front-back movement. The disclosed footrest configuration also advantageously prevents vertical separation of the footrest elements because the overlap and undercut provided on each footrest element interferes with separate up or down movement of either component. Each of these three dimensional stabilities are important in stabilizing exemplary footrest designs for use in wheelchair implementations according to the present disclosure.

A wheelchair of the disclosed design which incorporated the disclosed interlocking footrest system passed the standard durability test, ANSI/RESNA WC Standard January, 1998, Part 8. WC-08, whereas a wheelchair of similar design without the stabilizing effect of the interlocking footrests of the present disclosure failed the ANSI/RESNA WC Standard January, 1998, Part 8. Thus, the disclosed interlocking footrest design is highly advantageous for wheelchair users, while facilitating efficient and cost-effective wheelchair manufacture.

3. Protective, Non-Pinching Hinge with Extending Tongue and Undercut Area

The Coombs '276 patent discloses assembly of a chair utilizing a molded panel seat with a planar upper surface. This panel acts as half a hinge that is attached by a hinge pin to a like panel at the center and through retainers to the sides of the chair. The Coombs '276 chair can be folded and the seat center raised at the midline hinge pin. When the chair is opened, the hinge panels become parallel. The seat becomes weight bearing because the hinge pin is below the surface of the meeting hinge panels and the edges of the panels abut to each other in the flat parallel position.

The wheelchairs of the Coombs '276 patent are disadvantageous in that the hinge panels represent a safety hazard because, as the seating panels move from their essentially parallel position (when the chair is folded) toward a parallel orientation (when the seating elements are deployed and the chair is opened), the seating panels present a pinching possibility. This pinching occurs at the closing edges of hinge 31 of the Coombs '276 patent (see FIG. 2 thereof). Clothing, objects and especially midline body parts can be captured in the closing space between the two hinge seat panel halves. This problem is exacerbated should the closing be carried out by a person sitting on a partially opened chair. In this case, the weight of the individual forces the chair seat to a parallel orientation and, if the individual has simultaneously captured clothing or a body part in the narrow closing crevice, he/she faces an annoying to very serious problem that may result in pain, damage to body tissue and extreme difficulty in freeing himself/herself from the closing hinge because his/her weight is forcing the hinge closed. Such a situation might arise that a person thus trapped might not be able, due to physical limitations, to free himself/herself from this trapping mechanism.

Figure 7A:
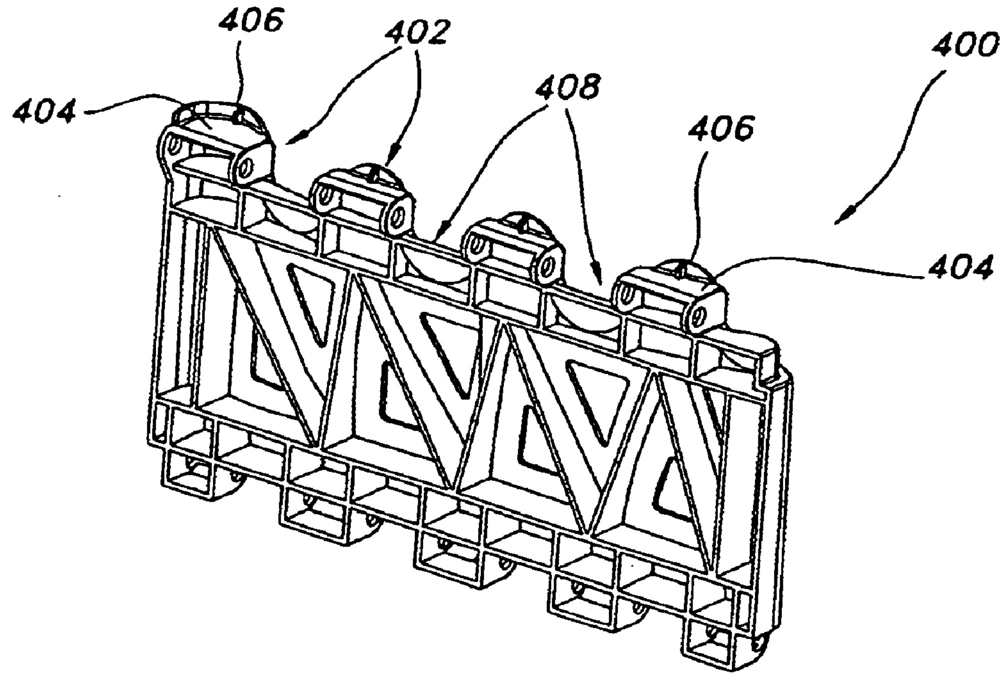
FIGS. 7A and 7B are bottom and top views of an exemplary seat panel according to an embodiment of the present disclosure.
Figure 7B:
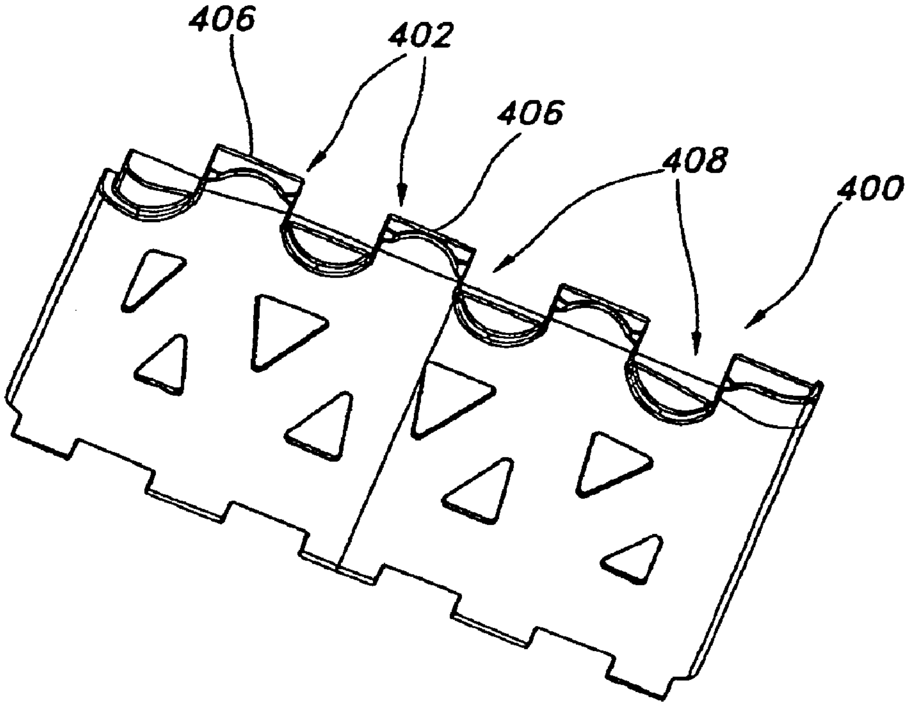
Figure 8:
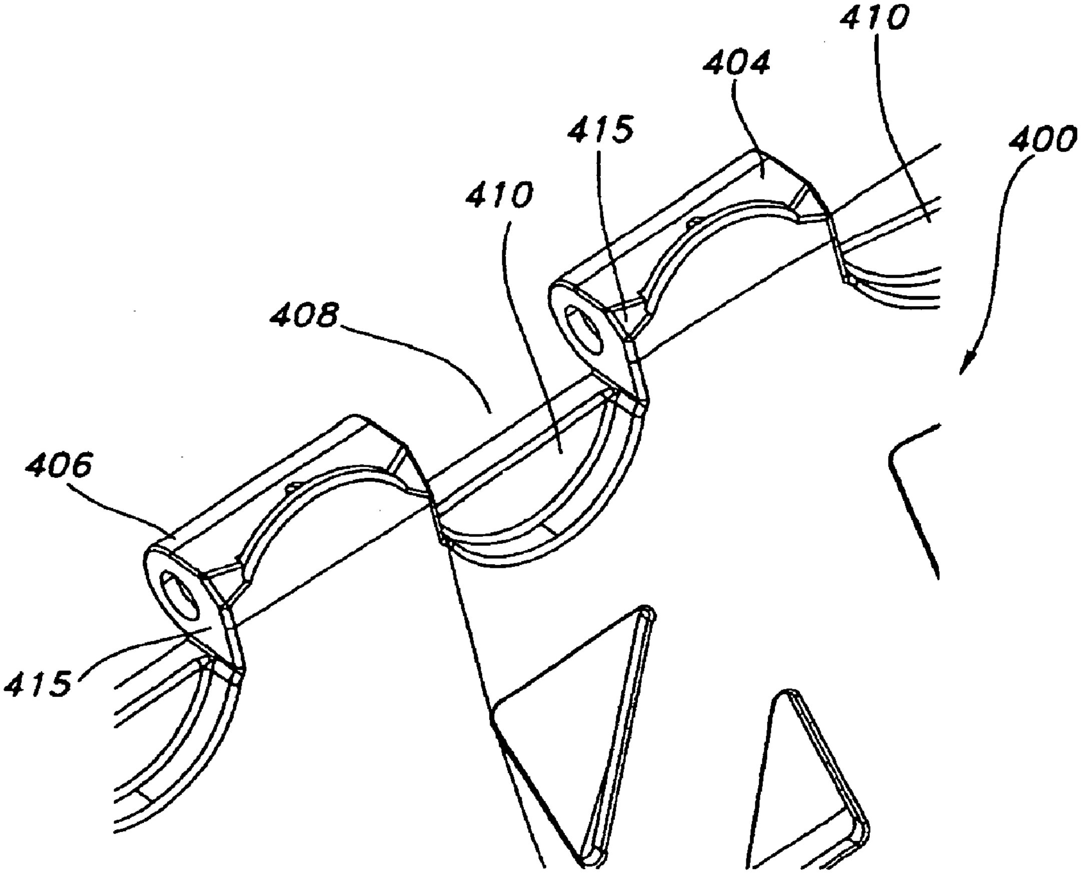
FIG. 8 is partial cutaway view of an exemplary hinge segment of a seat panel according to a further aspect of the present disclosure.

The present disclosure provides right/left identical seat panels that remove the possibility of in-line capture of objects in the closing hinge. A hinge seat panel 400 according to an exemplary aspect of the present disclosure is shown in FIGS. 7A (bottom view) and 7B (top view). According to the disclosed seat panel embodiment provided herein, each seat panel 400 is modified at the hinge-pin area 402 such that the hinges 404 include segmented sections with alternating extending hinge-pin sections 406 and receding sections 408 into which extended hinge-pin sections 406 will fit:

FIG. 8 depicts a cutaway, radiused receding hinge segment associated with an exemplary aspect of the present disclosure. As shown in FIG. 8, the top of each receding section surface is cut away in a semicircular manner to define a semicircular recess 410 that has a depth of approximately one-half of the hinge thickness. Semicircular recess 410 also typically defines a circular radius of half the hinge section length. The weight bearing capabilities of the hinge section when the seat elements are positioned parallel to each other is influenced to some degree by the thickness and overall strength/rigidity of the remaining opposed flat surfaces (i.e., in the absence of the "cutaway" material). Accordingly, it is desirable to ensure that an appropriate amount of material remains in the cutaway region to provide a desired level of strength and structural integrity.

Figure 9:
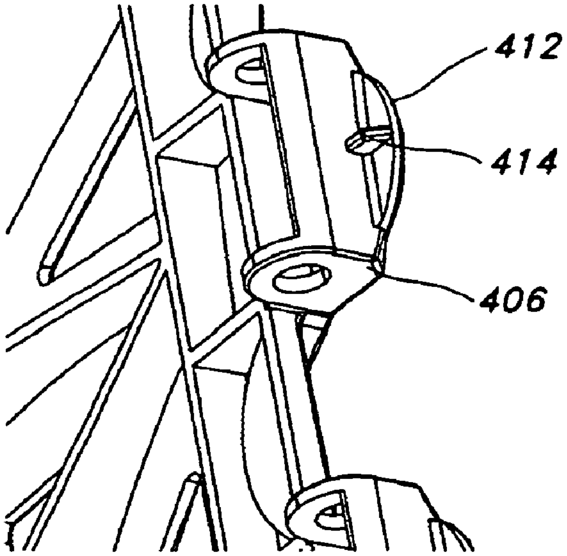
FIG. 9 is a partial bottom view of the exemplary hinge section of FIG. 8.

With reference to FIG. 9, in an exemplary embodiment of the present disclosure, the top of each extending hinge section is extended in a circular manner, i.e., defines a circular extension or tongue 412, so that such circular extension or tongue 412 will deploy over a corresponding cutaway portion 410 of a complementary receding section 408. The thickness of the extending tongue 412 is typically substantially equal to or less than the depth of the cutaway portion 410 of the receding section 412. In an exemplary embodiment of the present disclosure, the extending tongue 412 is approximately one half of the thickness of the cutaway portion 410. A support tab 414 may be advantageously introduced or formed under the extending tongue 412 to augment the weight bearing performance of the hinged seat 400. Additionally, angled cuts and/or angled surfaces 415 may be advantageously formed and/or defined in the hinge pin section(s) 406. The angled cuts/angled surfaces 415 extend into the hinge section 406 and advantageously reduce the possibility of pinching via a scissoring action, as described in greater detail below.

Figure 10:
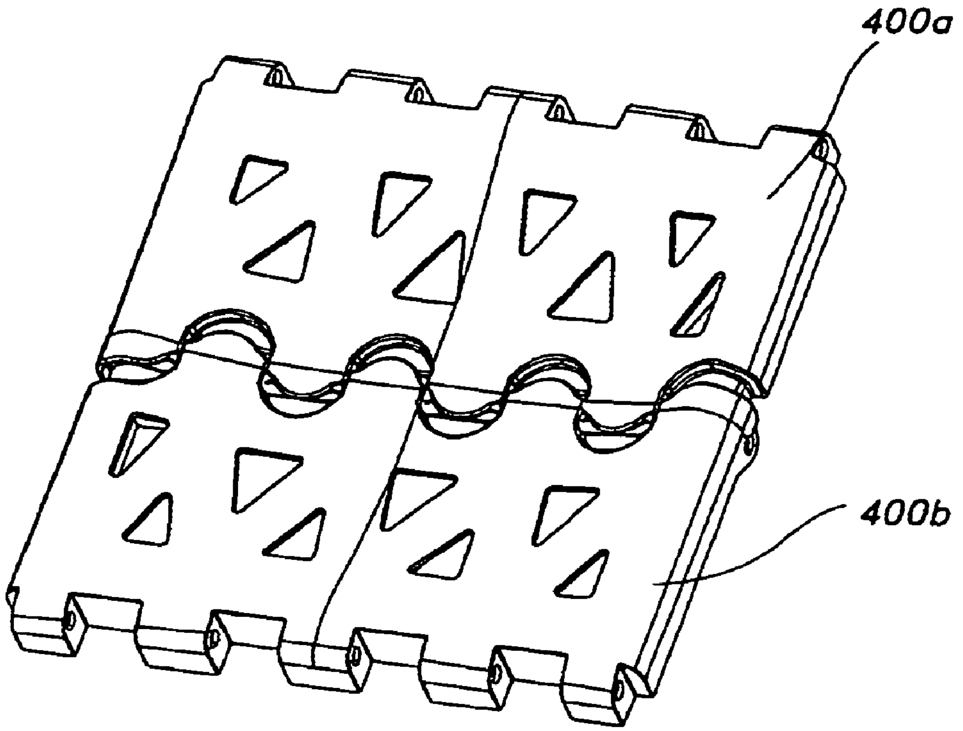
FIG. 10 is a top view of interlocking seat panels according to an aspect of the present disclosure.
Figure 11:
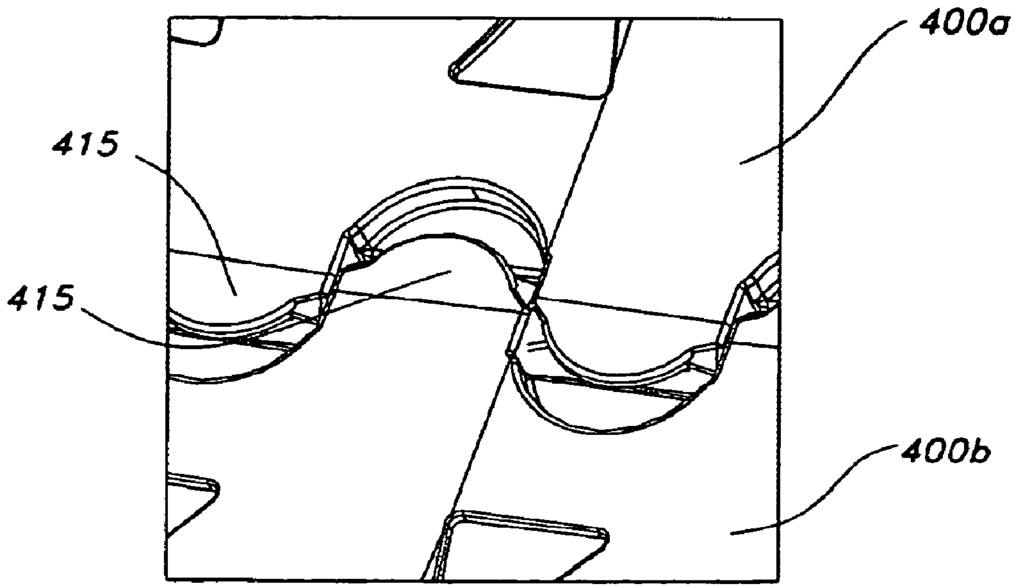
FIG. 11 is a partial view of the interlocking region of two exemplary seat panels according to the present disclosure.

As shown in FIG. 10, individual seat panels 400*a*, 400*b* are configured and dimensioned to advantageously interlock to define a stable assembly according to an exemplary aspect of the present disclosure. With reference to FIG. 11, details of pinch-free openings that are defined between interlocking seat panels 400*a*, 400*b* are shown. As shown in the assembly of FIG. 11, as the hinges of respective seat panels 400*a*, 400*b* rotate or pivot into a parallel orientation in connection with a wheelchair assembly, structural features associated with the advantageous seat panel design of the present disclosure effectively prevent the capture and/or pinching of external items, e.g., clothing, skin, fingers, and the like, at the center line therebetween, i.e., the region of interaction between seat panels 400*a*, 400*b*.

More particularly, as each extending tongue 412 closes over the corresponding cutaway section 410, the interaction between the angled surface(s) 415 and the adjacent tongue 412 ensures that there is space between adjacent tongues 412 to remove any potentially caught item(s). The cooperation of support tab 414 with the corresponding cutaway section 410 further assists in preventing the capture of item(s) therebetween. Thus, the structural design features associated with the tongues 412 and the associated structural elements/surfaces helps to ensure that seat panels 400*a*, 400*b* do not come into flush closure under pressure. The disclosed non-pinching seat panel design advantageously overcomes issues associated with prior art seat panel designs, while facilitating efficient and cost-effective wheelchair manufacture.

4. Multi-Position Axle and Axle Plate and Integrated Retaining System and Mobility System (Manual/Mechanical Wheelchair)

In the design of manual (mechanical) wheelchairs, critical specifications include the height of the seat from the planar surface upon which the chair rests and the front-back position of the axle as compared to the center of gravity of the chair and occupant. Since the height and mass and mass distribution of chair users varies, there is a need for the ability to adapt the chair height and the location of the axle to the needs of the chair's user. Users of different heights want different seat elevations; users who have significant upper body strength often want the rear of the seat lower than the front of the seat. More active chair users want the center of gravity of the loaded chair only a slight difference forward of the wheel contact with the ground. This configuration allows the user to tip up the front of the chair (perform a "wheelie") with minimum effort so that the user can surmount obstacles such as curbs. Less active users want the center of gravity far forward of the contact point of the rear wheel with the ground so that they will not accidentally tip backwards on a hill or when exerting some kind of effort. In most circumstances the adjustment will never be changed once it has been set for the user of the mobility system because the specific requirements of each individual user will not change.

The Coombs '276 patent discloses a foldable wheelchair construction with interchangeable right and left molded panels, wherein rear wheels are attached using a standardized plate attached with bolts; the plate can be adjusted vertically by selecting from multiple sets of holes molded into the side panel. (See page 11, line 30 of the Coombs '276 patent.)

The Coombs '276 wheelchair is disadvantageous in that the axle cannot be adjusted in the forward/rearward direction to adjust the relationship of the center of gravity to the point of contact of the rear wheel to the horizontal surface without providing a series of attachment points of axles into the plate described. In addition, the separate axle must be attached to the plate with sufficient permanence such that the axle will not fail in testing the wheelchair, e.g., in connection with the testing required by ANSI/RESNA WC Standard January, 1998, Part 8. WC-08.

According to one aspect of the present disclosure, an enhanced wheelchair design is provided that includes a combination axle and axle plate (and a molded panel designed to receive such axle and axle plate), such that the combination allows choice of at least two vertical and two horizontal positions in the assembly of the axle/axle plate combination to the molded side. Thus, in preferred implementations of this aspect of the present disclosure, advantageous axle/axle plate combinations as well as advantageous axle plates themselves, are employed. The disclosed molded panel is designed to receive the disclosed axle and axle plate such that the combination allows choice of at least two vertical and two horizontal positions in the assembly of the axle/axle plate combination to the molded side.

With reference to FIGS. 12–15, the disclosed axle/axle plate combination or subassembly 500 generally includes a square plate 502 of suitable thickness and composition with four holes 504 in a square pattern near the corners of the plate 502. Through one of the holes is inserted an axle extension 506 of the same diameter as the bolts that will be used to fasten the axle plate to the molded side of a wheelchair frame 200; the axle extension 506 is attached to the axle 508 itself which is of sufficient diameter, length and composition to support the rear wheel (not pictured) of the wheelchair. The axle extension/axle combination 500 is positioned so that the face of the larger diameter axle 508 abuts the face of the axle plate 502 and the assembly is bonded by welding or other means to form the multi-position axle/axle plate combination 500 of the present disclosure. A ferrule/stop 505 is typically employed to facilitate the foregoing mounting interaction.

The molded side 202 of the wheelchair 200 is generally designed so that four bolt holes 204 are provided with a square pattern at the appropriate position on the molded side 202. This means that the axle/plate combination 500 can be inserted with the axle extension 506 in any of the four holes 204.

The integrated axle combination 500 and molded side 202 are assembled by first choosing which of the four available positions 204 for mounting of the axle extension 506 to employ, inserting the axle extension 506 into any of the four bolt openings 204 in the molded side 202 and rotating the plate 502 so that the holes 504 in the plate 502 are aligned with the other three holes 204 in the molded side 202, and subsequently bolting the axle plate/axle combination 500 to the molded side 202. The wheel with an appropriate bearing can then be slipped over the axle 508 and fastened into place.

Figure 12:
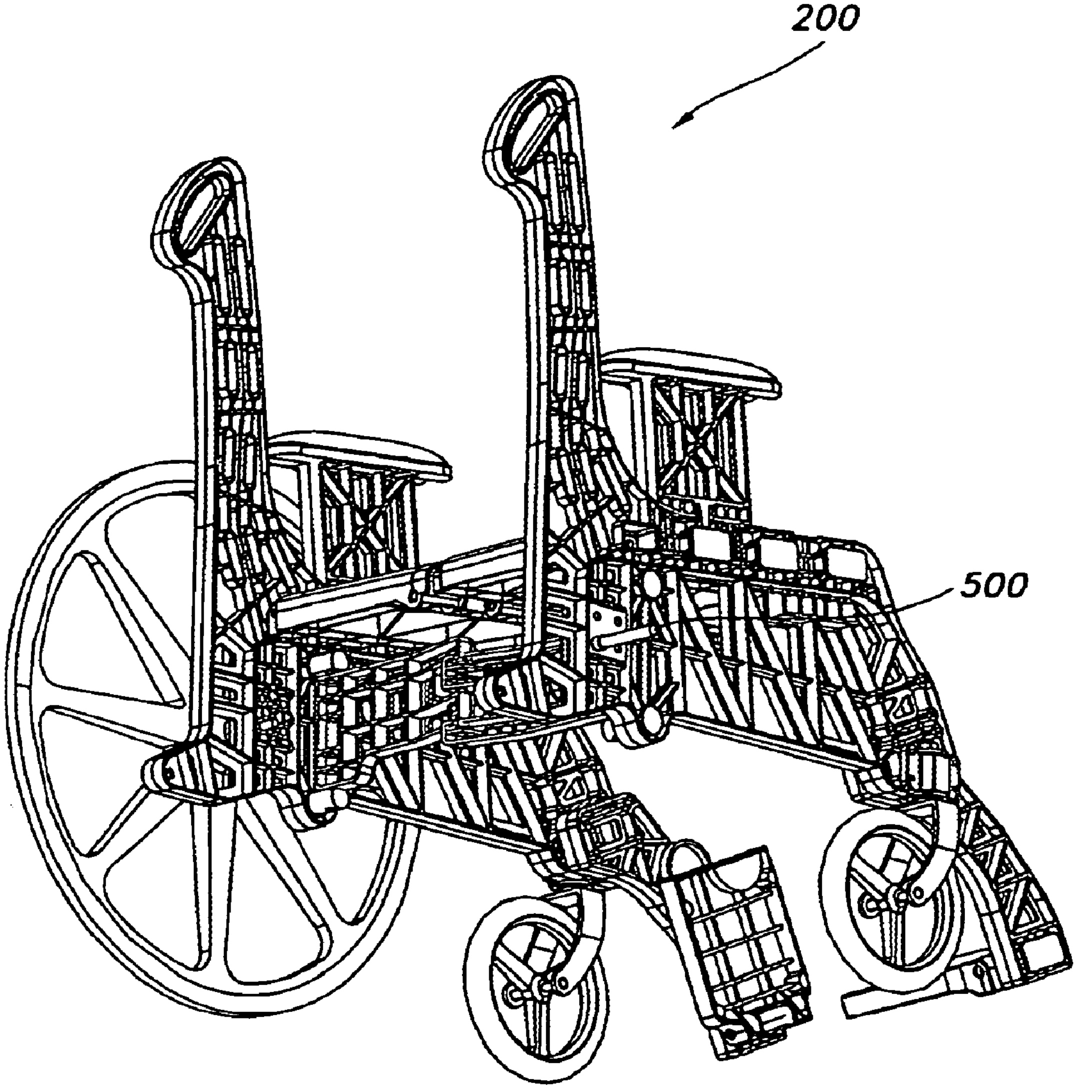
FIG. 12 is a perspective view of an exemplary wheelchair that includes an advantageous axle and axle plate according to one aspect of the present disclosure.
Figure 13:
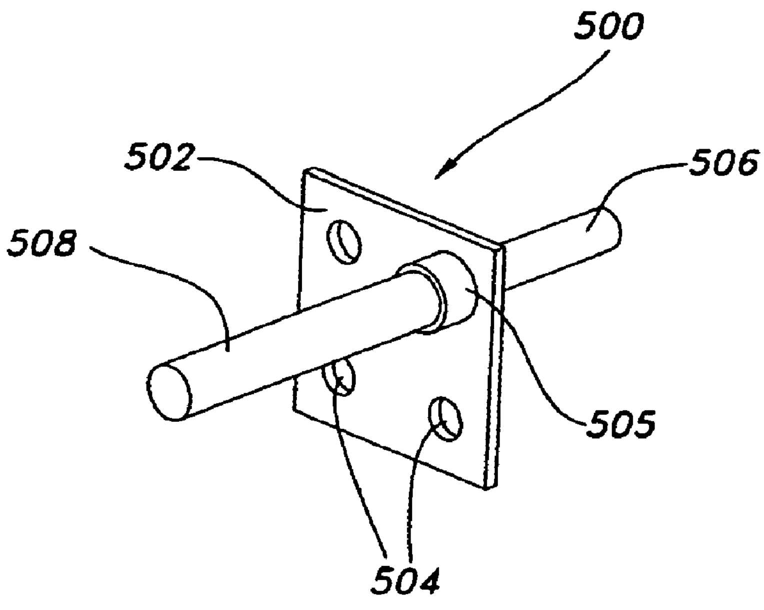
FIG. 13 is an engineering drawing of an exemplary axle/plate combination according to an aspect of the present disclosure.

FIG. 12 provides a drawing of an exemplary wheelchair 200 according to the present disclosure, with seat back and one rear wheel removed for clarity. With reference to FIG. 13, a drawing is provided that shows an exemplary integrated axle/plate combination 500 according to this exemplary aspect of the present disclosure. The axle/axle plate combination 500 and the molded sides 202 are advantageously designed so that right/left parts are identical (as described in the Coombs '276 patent).

Figure 14:
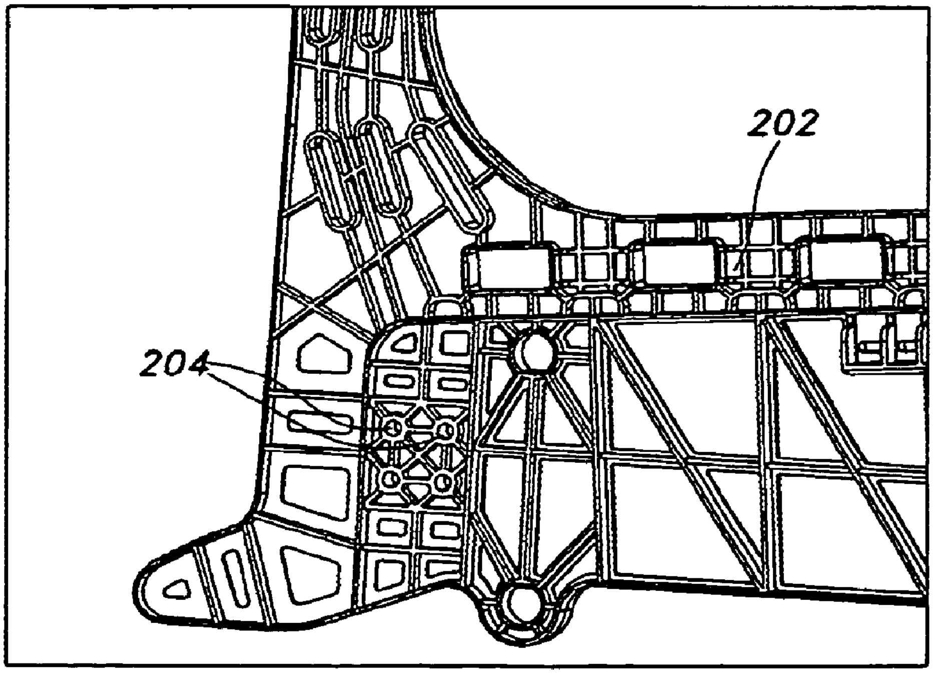
FIG. 14 is an engineering drawing of a molded side of an exemplary wheelchair according to the present disclosure that includes an attachment area for an advantageous axle plate.
Figure 15:
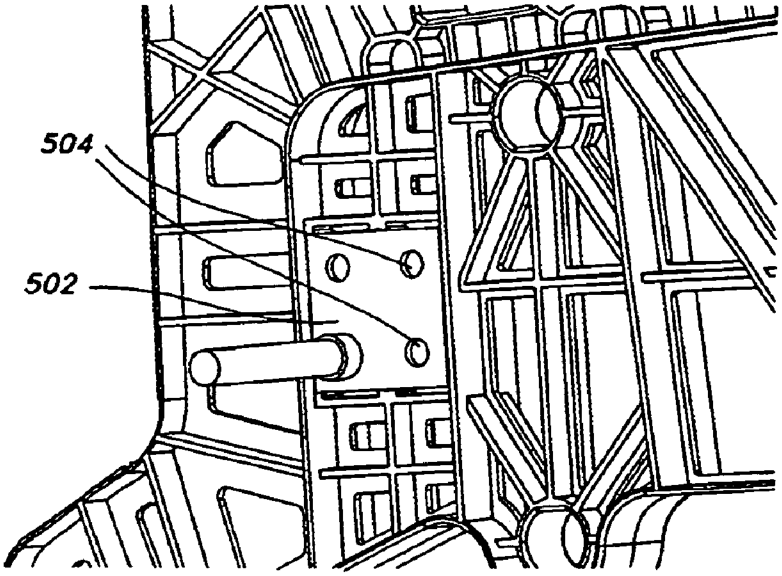
FIG. 15 is an engineering drawing showing an exemplary integrated axle/plate mounted to a molded side of a wheelchair according to one aspect of the present disclosure.

FIG. 14 provides a side view of a molded side 202 with appropriate bolt hole placement for insertion of the axle extension. FIG. 15 provides a view of the integrated axle/plate combination 500 inserted into or mounted with respect to the molded side 202 of a wheelchair. As shown, the sub-assembly of the integrated axle/plate combination 500 and the molded side 202 is effective to permit a wheel to be placed so that the seat is in the higher of two available positions and the axle is in the rearmost of the two available positions. Thus, the disclosed axle/plate combination 500 of the present disclosure provides enhanced flexibility to wheelchair users, while facilitating efficient and cost-effective manufacture of the disclosed wheelchair subassemblies and/or wheelchair products.

5. Right/Left Interchangeable Armrest Supports Integrated into Interlocking Foldable Wheelchair The Coombs '276 patent describes right/left interchangeable armrests integrated into a wheelchair. The integration of the armrest support(s) into the side of a chair of the Coombs '276 design and the wheelchair incorporating such armrest support(s) provide the starting point for the enhanced design disclosed herein.

The design of an armrest support assembly for a manual wheelchair must take into account the following considerations in assembly, disassembly and use of the chair. Ideally, the armrest should be easily installed and removed. Once installed, the armrest assembly should support load in the direct downward direction, and in downward load with a side-to-side component of load. Ideally, the armrest support should also resist upward pull so that a person lifting the chair using the armrests can do so without pulling the armrests from the chair. Additionally, ideally, armrests should be positionable to the front of the chair so that the user can use them as leverage for standing from a sitting position and they should be positionable toward the rear of the chair so that the chair and user can slip under a table or desk. Finally, the armrest support system should resist side-to-side forces and should not push out of the chair if a force is applied along the top edge of the armrest. ANSI/RESNA Wheelchair Standard, 1998, Part 8 at Section WC-08 describes testing and sets standards that evaluate some of the attributes listed above.

Figure 16:
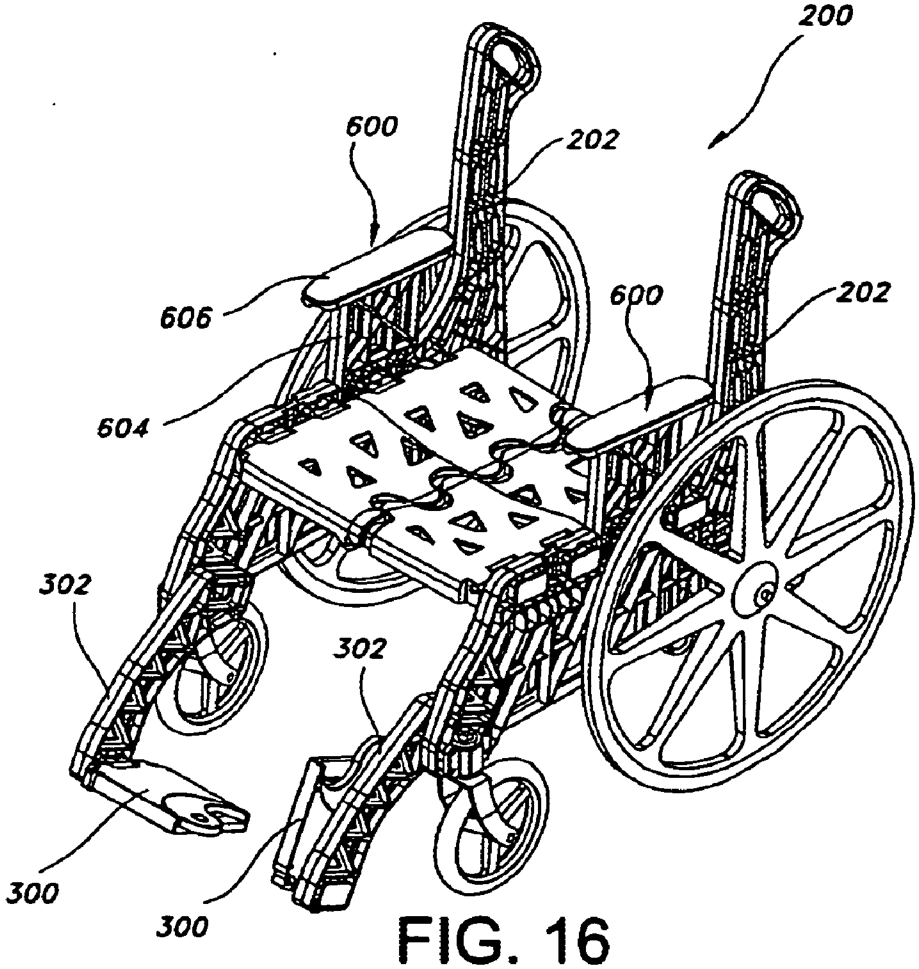
FIG. 16 is a perspective view of a wheelchair with exemplary armrests affixed to armrest supports according to an aspect of the present disclosure.
Figure 17:
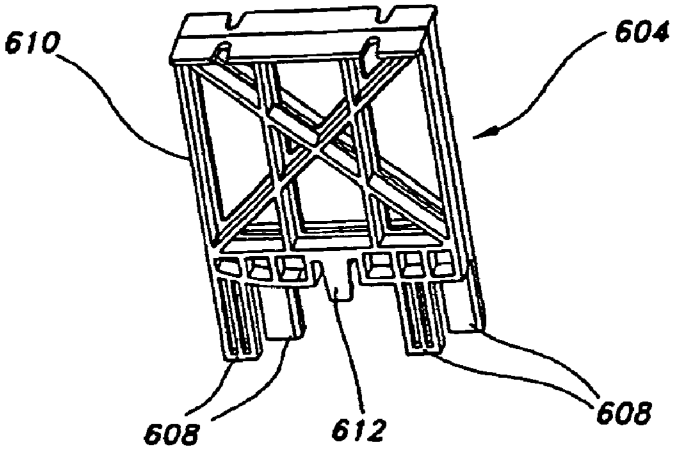
FIG. 17 is an engineering drawing showing an exemplary armrest support according to the present disclosure.

FIG. 16 shows an exemplary wheelchair 200 with right/left interchangeable sides 202, seat panels 100, footrests 300 movably mounted with respect to an extension flange 302, and an advantageous armrest subassembly 600 according to one aspect of the present disclosure. The armrest subassembly 600 is typically mounted with respect to an under seat arm and caster cover (associated with molded side 202) by way of right/left interchangeable armrest supports 604. The disclosed armrest supports 604 of the present disclosure generally include armrests 606 that are affixed or otherwise mounted with respect thereto. FIG. 17 shows an exemplary armrest support 604 according to the present disclosure. The armrest supports 604 of the present disclosure advantageously enable an integrated armrest-chair configuration that provides all of the desired attributes set forth above.

An exemplary molded armrest support according to the present disclosure includes four essentially rectangular extensions 608 that extend from a substantially rectangular or square box-like structure 610 upon which the armrest 606 itself (not pictured) is or can be affixed or mounted. In the pictured exemplary armrest support 604, the bottom of the box section 610 is curved to fit against the curve of the side section 202 when the armrest subassembly 600 is in its rearward position. The extensions 608 fit across and straddle two saddles on the top of the forward section of the molded side component 202 (see FIG. 20). There are three such saddles formed in or on the side component 202 and the use of the forward two of these (or the rearward two of these) allows adjustment of the armrest support 604 to forward or rear positions, respectively. In between the forward-most pair of extensions and the rearmost pair of extensions, a molded-in latch 612 snaps over the edge of the side component 202 on installation.

In the particular exemplary design, the four extensions 608 are configured so that in side view, they do not overlap, therefore allowing the mold for the injection molded part to be fabricated economically without inserts or sliding pins. In addition, the molded armrest support 604 of the present disclosure can be installed on either side of the wheelchair, i.e., the parts are right/left identical, as taught in the Coombs '276 patent. A wheelchair with armrest supports 604 according to the present disclosure inserted into or onto a chair side 202 as described herein passed the ANSI/RESNA Section WC-08 test as described above.

Figure 18:
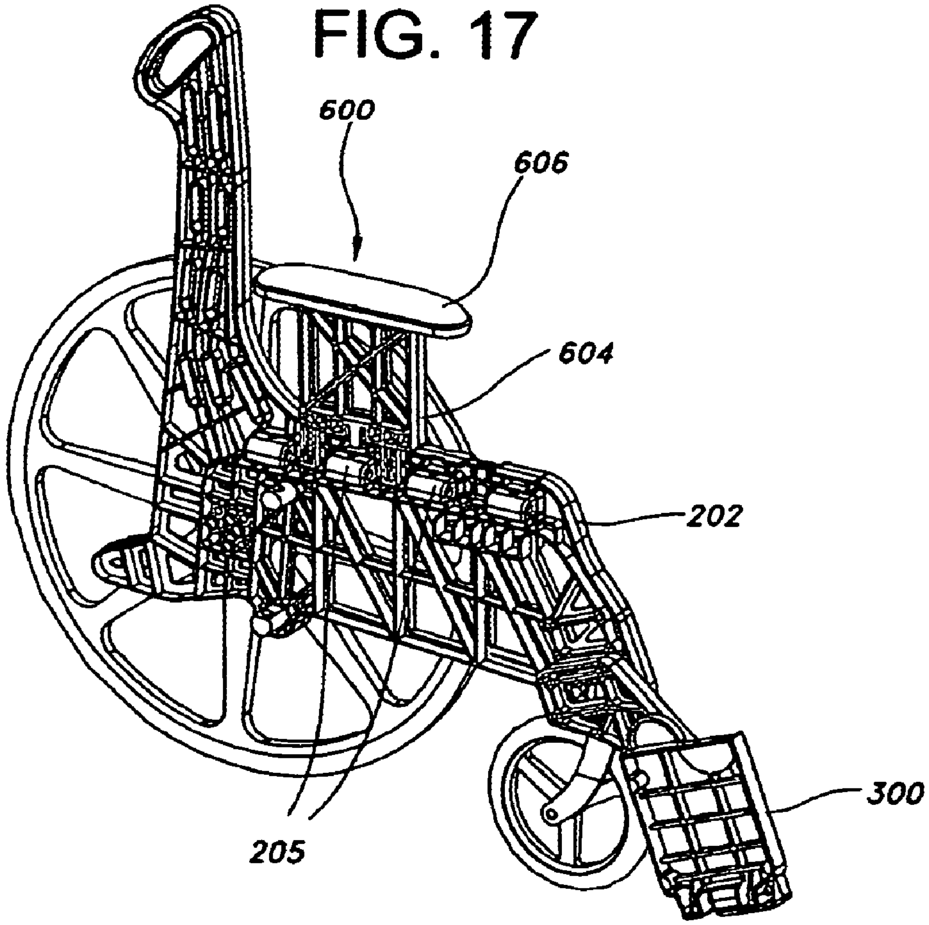
FIG. 18 is an engineering drawing showing an exemplary armrest support mounted to a wheelchair according to an aspect of the present disclosure.

FIG. 18 shows an engineering drawing of an exemplary armrest support 604 according to the present disclosure with armrest 606 installed. FIG. 18 further shows the relationship of the armrest support 604 to retainers 205 and the side 202 of the wheelchair against which the support 604 is restrained and into which it is integrated.

Figure 19:
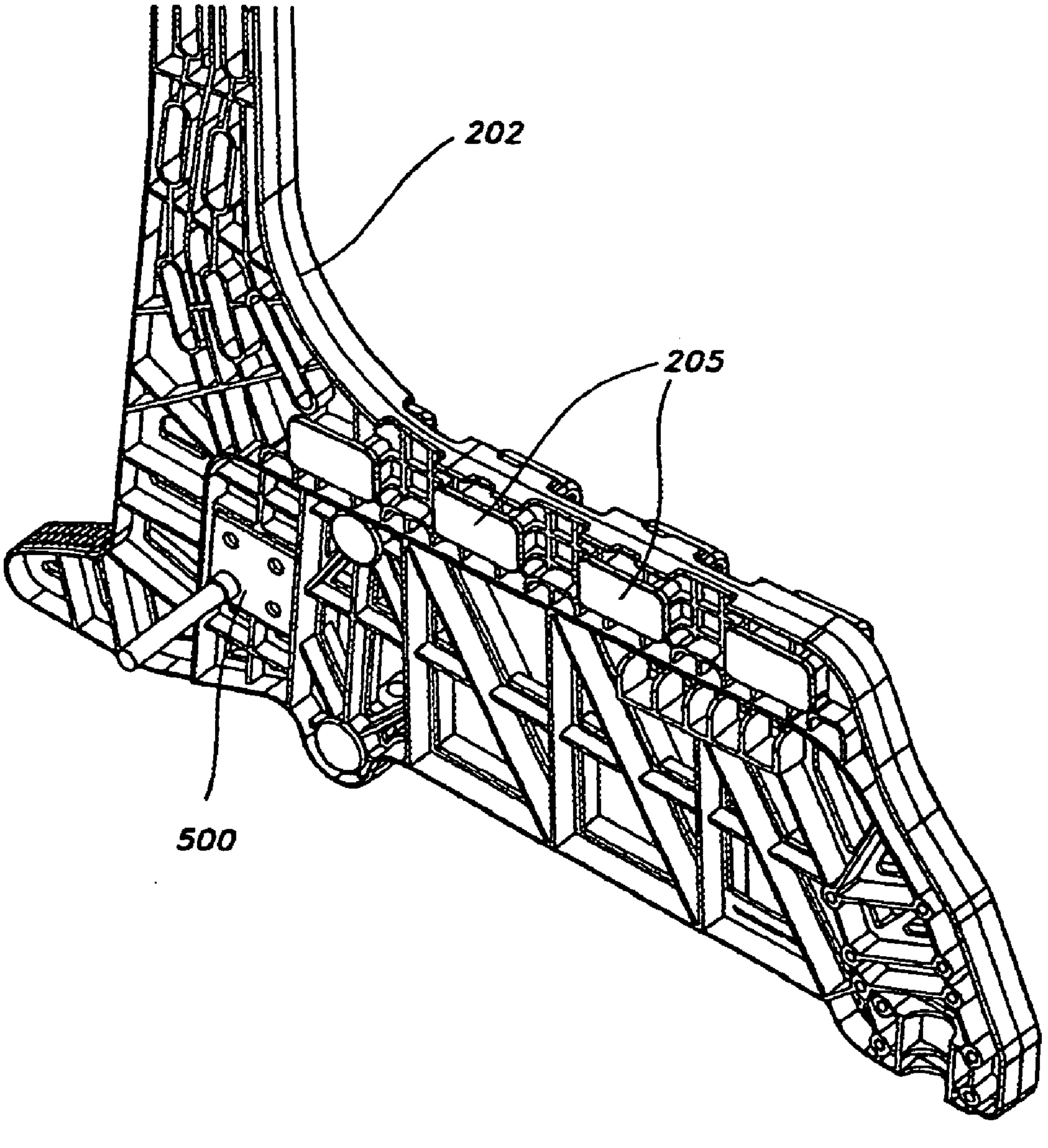
FIG. 19 is an engineering drawing showing the side an exemplary integrated assembly according to an aspect of the present disclosure.
Figure 20:
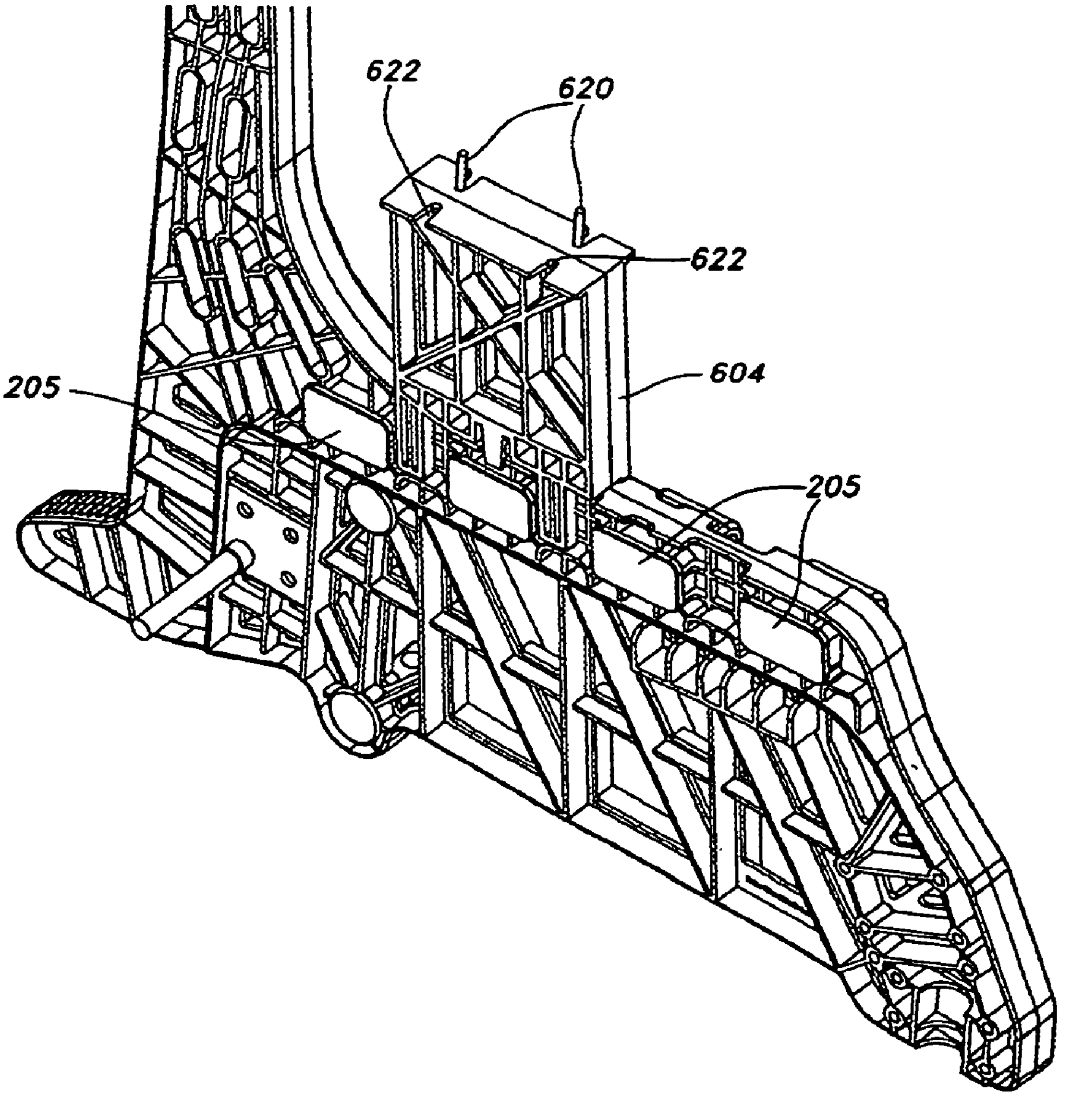
FIG. 20 is an engineering drawing showing an exemplary armrest support inserted into the side of FIG. 19, according to an aspect of the present disclosure.

FIG. 19 shows the side of an integrated assembly (without the armrest support) according to the present disclosure. The three narrow, long saddles on the top rail of the molded side 202 are designed to accept the leg extensions 608 of the armrest support 604; the two wide, short saddles on the molded side 202 provide the locations along the top where the armrest support 612 latches. Four retainers 205 that attach the side of the chair to the seat are also shown in FIG. 19. FIG. 20 shows an exemplary armrest support 604 inserted into or onto the side 202 that is shown in FIG. 19, herein above. Screws or bolts 620 are positioned in slots 622 and are used to secure an armrest 606 (not pictured) with respect to support 604.

Many other possible configurations are possible to achieve the desired objectives of the disclosed armrest support system 600 of the present disclosure. In addition, the disclosed armrest support may be used as a universal support for the introduction of other components into or onto the wheelchair, such as trays, utensils, tools, graspers, and other items required to maintain the life style of the user of a wheelchair.

As noted above, the present disclosure provides a plurality of designs and enhancements for use and/or incorporation as part of a wheelchair design/product. The individual designs and/or enhancements disclosed herein may be employed individually and/or in combination (or as sub-combinations) in the wheelchair field without departing from the spirit or scope of the present disclosure.

Although the present disclosure has been described with reference to specific exemplary embodiments thereof, the present disclosure is not to be limited thereby. Rather, modifications, changes and/or enhancements may be undertaken with respect to the disclosed wheelchair enhancements without departing from the spirit or scope of the present disclosure. Additional modifications, changes and/or enhancements may become apparent based on the detailed disclosure provided herewith, and such modifications, changes and/or enhancements are encompassed hereby.

The invention claimed is:

1. In a wheelchair that includes first and second sides, the improvement comprising:

(a) a first contoured folding seat panel that is hingedly mounted with respect to said first side, said first contoured folding seat panel defining at least one first segmented section that includes a first extension and a first cutaway portion, (b) a second contoured folding seat panel that is hingedly mounted with respect to said second side, said second contoured folding seat panel defining at least one second segmented section that includes a second extension and a second cutaway portion;

wherein said first extension is configured and dimensioned to cooperate in an overlaying relationship with said second cutaway portion when said first and second contoured folding seat panels are brought into substantially parallel alignment, wherein said second extension is configured and dimensioned to cooperate in an overlaying relationship with said first cutaway portion when said first and second contoured folding seat panels are brought into substantially parallel alignment, and wherein each of said folding seats provides contouring in both front-to-back and side-to-side directions.

2. A wheelchair according to claim 1, wherein said contouring is identical at front and back so that said first and second contoured folding seat panels can be reversed front-to-back and used to make a complete seat.

3. A wheelchair according to claim 1, further comprising at least one angled surface adjacent said first extension to facilitate removal of an item between said first and said second contoured folding seat panel when said first and second contoured folding seat panels are brought into substantially parallel alignment.

4. A wheelchair according to claim 1, wherein each of said first and second extensions defines an arcuate outer edge.

5. A wheelchair according to claim 1, wherein each of said first and second cutaway portions defines a depth and wherein each of said first and second extensions defines a thickness, and wherein said depth of said first and second cutaway portions and said thickness of said first and second extensions are selected to provide a substantially smooth transition between said first and second contoured folding seat panels when said first and second contoured folding seat panels are brought into substantially parallel alignment.

6. A wheelchair according to claim 1, wherein said first and second contoured seat panels are configured and dimensioned with mirror-like symmetry, such that 180° rotation permits use of either of said first and second contoured seat panels at the right side or left side of said wheelchair.

7. A wheelchair according to claim 1, wherein each of said first and second seat panels define a hinge-pin area that provides segmented sections with alternating extending hinge-pin sections and receding sections into which extended hinge-pin sections interlock.

8. In a wheelchair that includes first and second sides, the improvement comprising:

(a) a first footrest pivotally mounted with respect to said first side;

(b) a second footrest pivotally mounted with respect to said second side;

wherein said first and second footrests are identical and wherein an interlocking mechanism is formed on said first and second footrests to provide lateral, front-to-back and up-down stability as the wheelchair is operated, wherein said interlocking mechanism includes a first indented region and a first extending tongue defined on said first footrest, and a second indented region and a second extending tongue defined on said second footrest, and wherein said first extending tongue is adapted to move in and out of interlocking engagement relative to said second indented region when said first footrest is pivoted relative to said first side.

9. A wheelchair according to claim 8, wherein said first and second footrest are pivotally mounted with respect to first and second flange extensions, respectively.

10. A wheelchair according to claim 8, wherein said second extending tongue is adapted to move in and out of interlocking engagement relative to said first indented region when said second footrest is pivoted relative to said second side.

11. A wheelchair according to claim 8, further comprising a tooth in at least one of the first and second indented regions for cooperating with a cooperating extending tongue.

12. In a wheelchair that includes first and second pivotally mounted seat panels, the improvement comprising:

(a) an extending tongue and an indented region formed on each of said first and second pivotally mounted seat panels, (b) at least one outwardly extending angular surface formed on each of said extending tongues, said at least one angular surface dimensioned and configured to abut an adjacent extending tongue from a cooperating seat panel and functioning to limit in-line capture of objects therebetween, wherein the extending tongue formed on said first pivotally mounted seat panel is configured and dimensioned to cooperate in an overlaying relationship with an indented region of said second pivotally mounted seat panel when said first and second pivotally mounted seat panels are brought into substantially parallel alignment.

13. A wheelchair that includes first and second sides, the improvement comprising:

(a) a first contoured folding seat panel that is hingedly mounted with respect to said first side;

(b) a second contoured folding seat panel that is hingedly mounted with respect to said second side;

(c) an extending tongue and an indented region formed on each of said first and second pivotally mounted seat panels;

(d) at least one outwardly extending angular surface formed on each of said extending tongues, said at least one angular surface dimensioned and configured to abut an adjacent extending tongue from a cooperating seat panels and functioning to limit in-line capture of objects therebetween;

(e) a first footrest pivotally mounted with respect to said first side;

(f) a second footrest pivotally mounted with respect to said second side;

(g) first and second axle and axle plate combinations that are configured and dimensioned for mounting to said first and second sides, each of said axle plates including at least four spaced mounting apertures;

(h) a mounting region formed on each of said first and second sides, said mounting regions including at least four spaced mounting holes that are dimensioned and arrayed in a cooperative manner relative to said at least four spaced mounting apertures formed in said first and second axle plates; and (i) at least one armrest support that includes a plurality of spaced mounting extensions that are configured and dimensioned to engage at least one of said first and second side;

wherein each of said folding seats provides contouring in both front-to-back and side-to-side directions;

wherein said first and second footrests are identical and wherein an interlocking mechanism is formed on said first and second footrests to provide lateral, front-to-back and up-down stability as the wheelchair is operated.

* * * * *